No. 805,195. PATENTED NOV. 21, 1905.
A. H. GIBSON.
ELECTROPNEUMATIC CHANNELER.
APPLICATION FILED APR. 27, 1905.
4 SHEETS—SHEET 2.

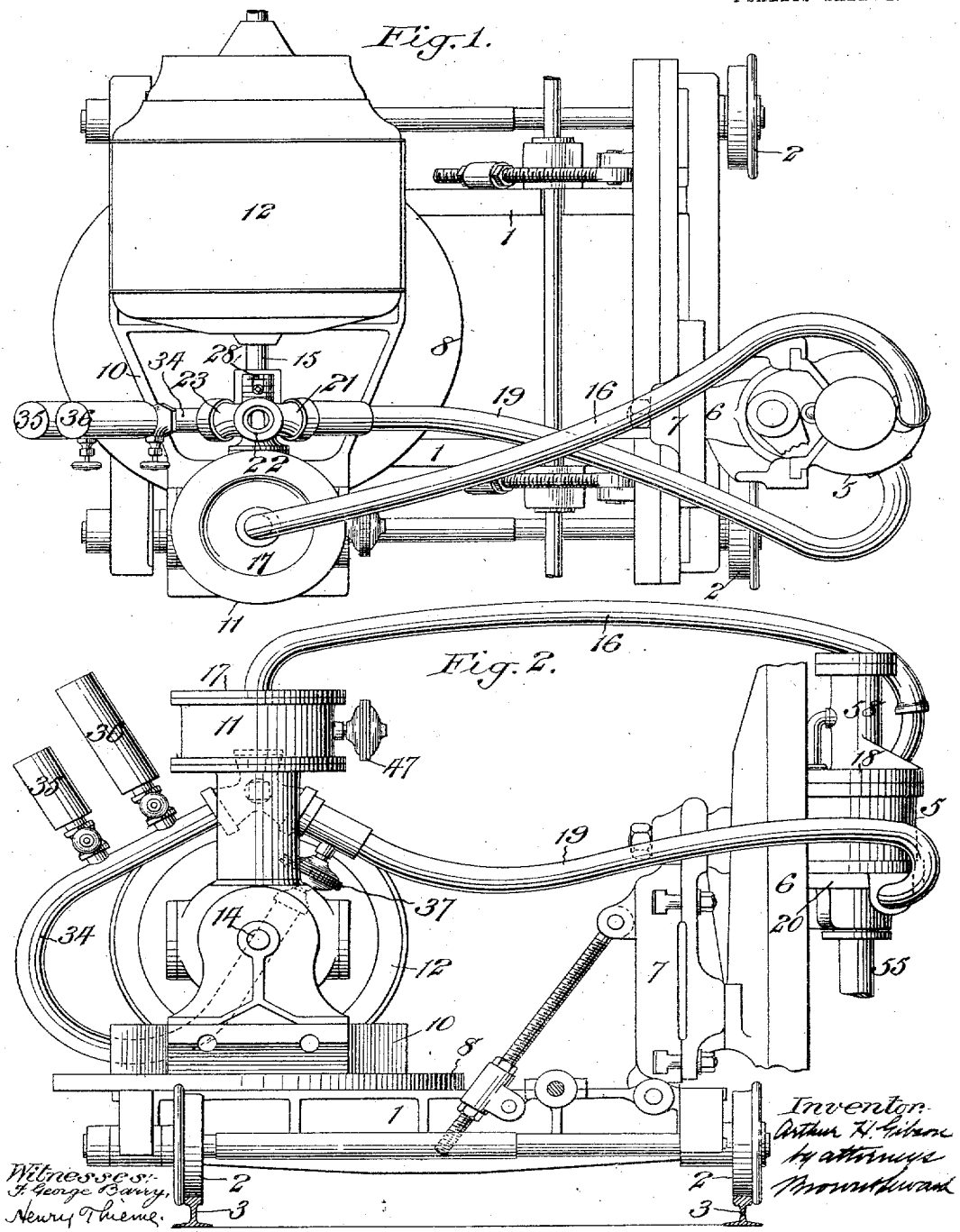

Witnesses:
F. George Barry,
Henry Thieme.

Inventor:
Arthur H. Gibson
by attorneys

No. 805,195. PATENTED NOV. 21, 1905.
A. H. GIBSON.
ELECTROPNEUMATIC CHANNELER.
APPLICATION FILED APR. 27, 1905.

4 SHEETS—SHEET 3.

Witnesses:
F. George Barry,
Henry Thieme.

Inventor:
Arthur H. Gibson
by attorneys

No. 805,195. PATENTED NOV. 21, 1905.
A. H. GIBSON.
ELECTROPNEUMATIC CHANNELER.
APPLICATION FILED APR. 27, 1905.

4 SHEETS—SHEET 4.

Witnesses:
F. George Barry
Henry Thieme

Inventor:
Arthur H. Gibson
by attorneys

UNITED STATES PATENT OFFICE.

ARTHUR HENRY GIBSON, OF EASTON, PENNSYLVANIA, ASSIGNOR TO THE INGERSOLL-SERGEANT DRILL COMPANY, OF NEW YORK, N. Y., A CORPORATION OF WEST VIRGINIA.

ELECTROPNEUMATIC CHANNELER.

No. 805,195.  Specification of Letters Patent.  Patented Nov. 21, 1905.

Application filed April 27, 1905. Serial No. 257,737. REISSUED

*To all whom it may concern:*

Be it known that I, ARTHUR HENRY GIBSON, a subject of the King of Great Britain, and a resident of Easton, in the county of Northampton and State of Pennsylvania, have invented a new and useful Improvement in Electropneumatic Channelers, of which the following is a specification.

The object of this present invention is to provide certain improvements in track-channelers whereby the pipes which connect the channeler-cylinder with the presser-cylinder may be made very short and the channeler at the same time capable of being adjusted along its support to any desired position.

A further object is to provide certain improvements in the construction, form, and arrangent of the several parts of the machine whereby the operation of the channeler-tool may be easily controlled.

Figure 3:
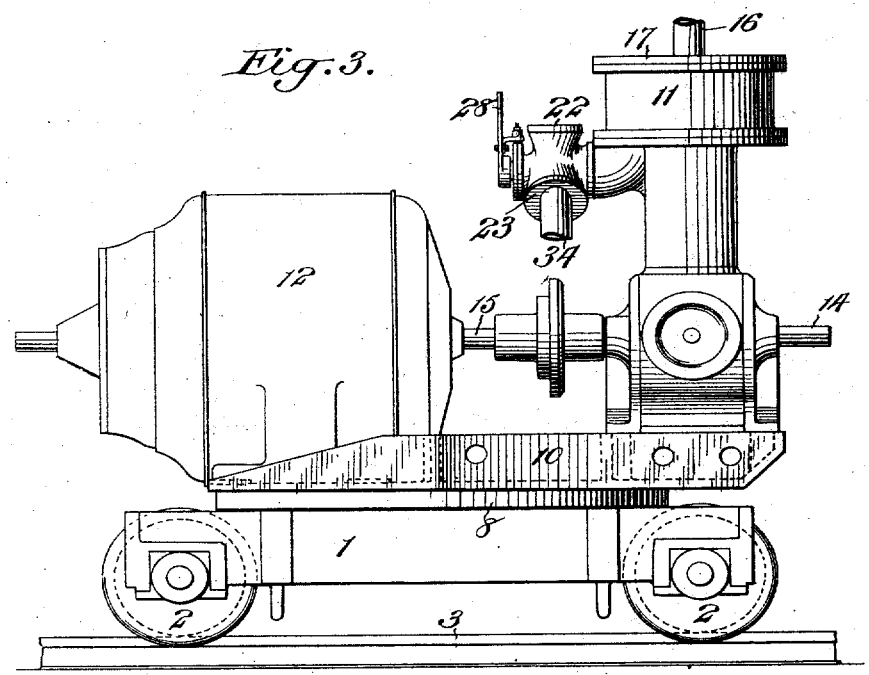
Figure 4:
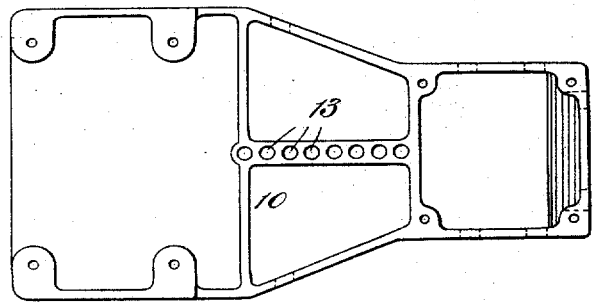
Figure 5:
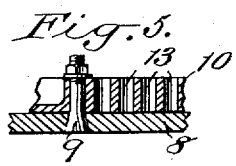
Figure 6:
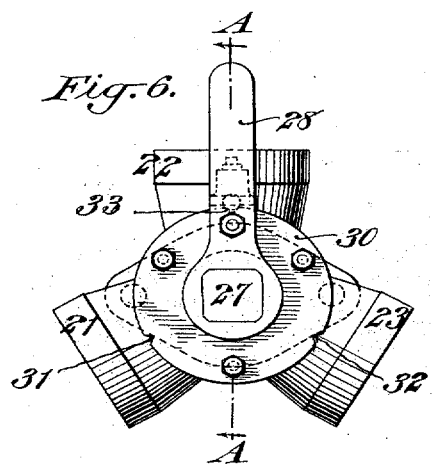
Figure 7:
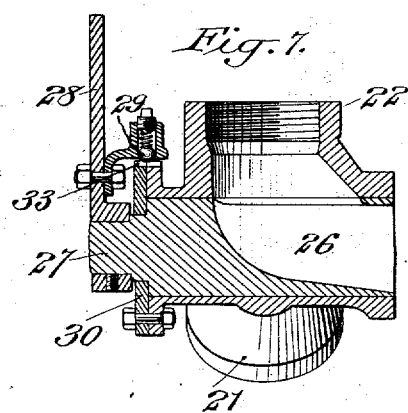
Figure 8:
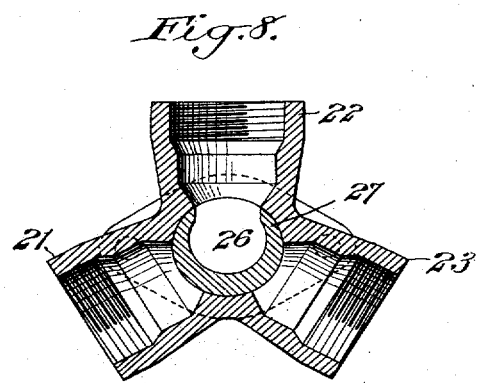
Figure 9:
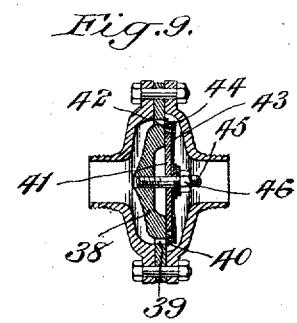
Figure 10:
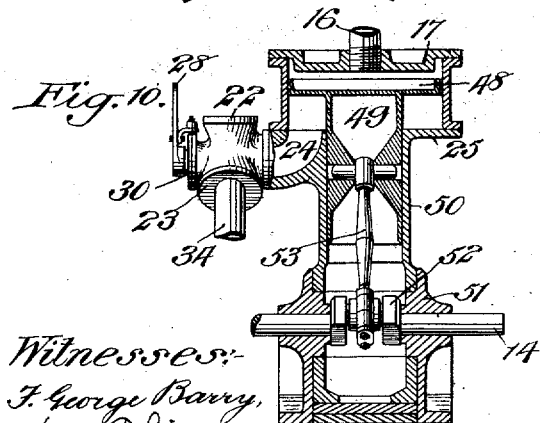
Figure 11:
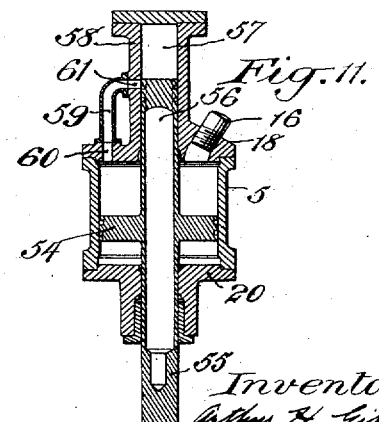
Figure 12:
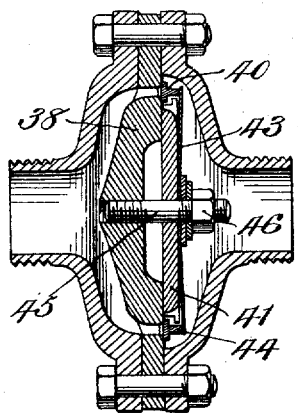
Figure 13:
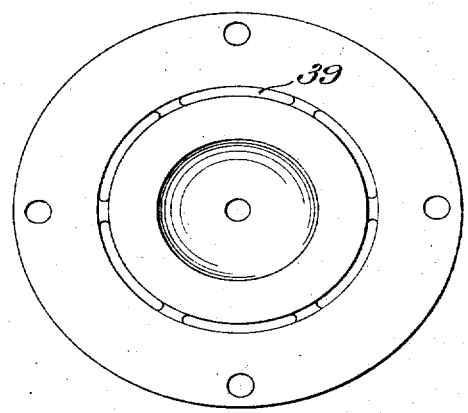
Figure 14:
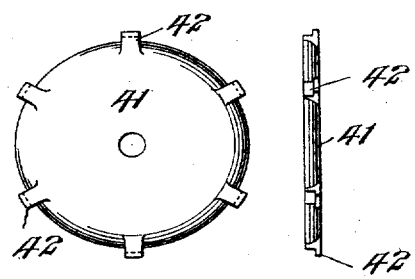
Figure 15:
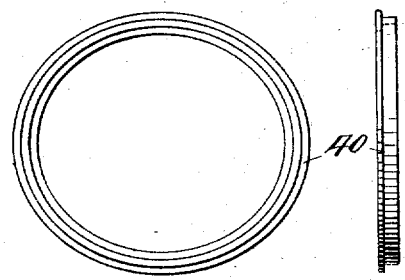
Figure 16:
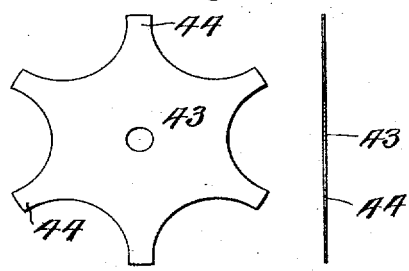

In the accompanying drawings, Figure 1 represents in top plan a track-channeler with my improvement embodied therein. Fig. 2 is an end view of the same. Fig. 3 is a side view. Fig. 4 is a detail plan view of the swivel-frame which supports the motor and presser. Fig. 5 is a fragmentary section showing the swivel connection between the frame and base-plate of the truck. Fig. 6 is a detail view, in end elevation, of the three-way valve. Fig. 7 is a longitudinal central section through the same in the plane of the line A A of Fig. 6 looking in the direction of the arrow. Fig. 8 is a transverse vertical section through the valve. Fig. 9 is a detail view, in central section, of one of the one-way valves. Fig. 10 is a vertical central section, partially in side elevation, showing the air-presser. Fig. 11 is a vertical central section through the channeler-cylinder. Fig. 12 is an enlarged central section through one of the one-way valves. Fig. 13 is a face view of the valve-seat. Fig. 14 shows back and edge views, respectively, of the valve-retaining plate. Fig. 15 shows back and side views, respectively, of the valve proper; and Fig. 16 shows in face and edge views, respectively, the valve-seating spring.

The truck of the channeler is herein denoted by 1, its wheels by 2, and the track-rails by 3. The channeler-cylinder 5 is mounted on a shell 6, which is longitudinally adjustable on a swinging back frame 7, hinged to the truck, as usual. A circular base-plate 8 is located on the truck 1, from which base-plate uprises a swivel-bolt 9. A frame 10 for the presser 11 and motor 12 is swiveled on the bolt 9. This swivel-frame 10 may be adjusted radially for bringing the presser 11 nearer to or farther away from the channeler-cylinder in the present instance by providing the swivel-frame with a plurality of holes 13 in one of its vertical webs.

The shafts 14 15 of the presser and motor, respectively, are herein shown as coupled together in alinement, and the motor is shown as an electric motor. A flexible pipe 16 leads from the top cylinder-head 17 of the presser to the top cylinder-head 18 of the channeler for opening communication between the upper part of the presser-cylinder chamber with the upper part of the channeler-cylinder chamber. Another flexible pipe 19 leads from the lower cylinder-head 20 of the channeler to one branch 21 of the three-way valve carried by the presser. This three-way valve has also an exhaust branch 22 and a third branch 23. Any one of its branches may be brought into open communication with the lower end of the presser-cylinder through a port 24 in the lower head 25 of the presser-cylinder and a port 26 in the plug 27 of the valve. This plug 27 may be held in its different rotary adjustments by means of a handle 28, having a spring-actuated ball 29 engaging the periphery of a stationary plate 30, which plate is provided with three notches 31 32 33, corresponding to the three branches 21 22 23 of the valve.

The branch 23 of the valve is provided with a flexible pipe 34, which communicates with air-receivers 35 36 of variable capacities and leads to the flexible pipe 19 near its connection with the branch 21. A one-way valve 37 is located in the pipe 34 between the receivers 35 36 and the pipe 19, the purpose of which valve will be seen hereinafter. This valve comprises a two-part casing having a valve-seat 38 provided with an annular opening 39. This opening 39 in the valve-seat is opened and closed by an annular valve 40, the outward movement of which valve is limited by a centrally-arranged retaining-plate 41, having peripheral lugs 42 overlapping the valve at intervals. This valve 40 is of angular construction in cross-section, and it is held yieldingly closed by a disk spring 43, the fingers 44 of which engage with the said valve. A bolt 45 and nut 46 serve to hold the retaining-plate 41 and spring 43 in position on the valve-seat 38. For admitting air from the exterior to the interior of the presser-cylinder intermediate its ends I provide another one-way valve 47, quite similar in construction to the valve 37, which valve in this instance acts as an induction-valve. This valve 47 is so arranged that it will alternately admit air to the spaces above and below the air-presser piston 48 as the piston is reciprocated. This piston 48 is provided with a trunk 49, which is fitted to slide in the interior of the hollow body 50, which connects the lower head 25 with the crank-casing 51. This piston-trunk 49 is connected to the crank 52 of the shaft 14 by a pitman-rod 53.

The piston of the channeler is denoted by 54, and it is provided with the usual depending piston-rod 55, to which the tool (not shown herein) may be secured. In addition thereto the piston 54 is provided with an upwardly-extended plunger 56, which is fitted to slide in the bore 57 of a smaller cylinder 58, which surmounts the top head 18 of the channeler-cylinder 5. A short pipe 59 connects a port 60, opening into the upper part of the cylinder-chamber, with a port 61, opening into the bore 57. This port 61 is preferably so arranged that open communication will be established between the upper part of the cylinder-chamber and the bore when the piston 54 is near the limit of its downward movement.

In operation the channeler-tool may be adjusted along the truck to any desired point, and as it is being adjusted to this point the presser and motor will be turned on their support, thus enabling me to use the shortest possible length of pipe through which the air is compelled to pass between the presser-cylinder and channeler-cylinder. Furthermore, the presser and motor may be adjusted bodily toward and away from the channeler by shifting their swivel-frame 10 on the base-plate 8. In the accompanying drawings the motor and presser are shown as adjusted to their nearest point to the channeler. When the plug 27 of the three-way valve is turned into position to open communication between the lower parts of the presser and channeler-cylinder chambers, the reciprocation of the piston 48 will impart a full downstroke to the channeler-piston. The upstroke of the channeler-piston, however, will be cushioned by the compression of the air in the bore 57 of the cylinder 58 after the plunger 56 cuts off the port 61. The valve 47 of the presser-cylinder is so arranged that whenever the pressure on either side of the presser-piston falls below that of the external atmosphere the valve will admit air thereto. It will thus be seen that as the presser-piston is reciprocated the columns of air will be moved back and forth in the pipes 16 and 19 for reciprocating the piston 54 to obtain the full effect of the tool in the rock upon which it is operated. When the plug 27 is turned into position to close communication between the lower end of the channeler-cylinder chamber and the lower end of the presser-cylinder chamber and the lower end of the presser-cylinder chamber is opened to the variable-pressure receivers 35 36 in the pipe 34 as the channeler-piston is forced downwardly because of the admission of air from the top of the presser-cylinder chamber to the top of the channeler-cylinder chamber, the air in the bottom of the channeler-cylinder chamber and in the pipe 19 will be compressed, as it has no way of escape, thus preventing the piston 54 from performing a complete downward stroke. Ordinarily when working under these conditions the air would leak away from beneath the channeler-piston and the channeler-piston would finally strike the bottom head. This is prevented, for the reason that when the pressure in the pipe 19 falls below the receiver-pressure in the pipe 34 the valve 37 will automatically open, and thus permit the air from the receiver-pipe 34 to escape into the pipe 19 and cause it to retain its cushioning effect. When the plug 27 of the three-way valve is turned into position to open the under side of the presser-cylinder chamber to the atmosphere through the branch 22, it will be seen that communication to the variable receiver-pipe 34 is closed, and also communication through the pipe 19 is closed. In this position the downward movement is imparted to the channeler-piston against compression in the pipe 19 without permitting the recharging of the variable receivers when the presser-piston moves downwardly. This is done when the receivers 35 36 are fully charged and it is desired to take the load off from the presser-piston during its downward movement.

It will be seen by the arrangement which I have provided for holding the valve-plug 27 in its different adjustments all danger of causing the air underneath the rapidly-reciprocating presser-piston being discharged through a small orifice, and thereby causing the piston to use an abnormal power or impart dangerous strains to the the working parts, is obviated.

The construction of the valves 37 and 47 is such as to permit a very free passage of the air through the valves with a slight movement of the same.

It is evident that various changes might be resorted to in the construction, form, and arrangement of the several parts without departing from the spirit and scope of my invention. Hence I do not wish to limit myself strictly to the construction herein set forth; but

What I claim as my invention is—

1. In combination, a truck, a channeler adjustably mounted thereon and a presser adjustably mounted on the truck whereby the channeler and presser cylinders may be kept in close proximity to each other as the channeler is adjusted to different positions along the truck.

2. In combination, a truck, a channeler adjustably mounted thereon and a presser and motor adjustably mounted on the truck whereby the channeler and presser cylinders may be kept in close proximity to each other as the channeler is adjusted to different positions along the truck.

3. In combination, a truck, a channeler adjustably mounted thereon and a presser swiveled on the truck whereby the channeler and presser cylinders may be kept in close proximity to each other as the channeler is adjusted to different positions along the truck.

4. In combination, a truck, a channeler adjustably mounted thereon and a motor and presser swiveled on the truck whereby the channeler and presser cylinders may be kept in close proximity to each other as the channeler is adjusted to different positions along the truck.

5. In combination, a truck, a channeler adjustably mounted thereon and a radially-adjustable presser swiveled on the truck whereby the presser may be adjusted into close proximity to the channeler and kept in such relationship as the channeler is adjusted to different positions along the truck.

6. In combination, a truck, a channeler adjustably mounted thereon, a radially-adjustable motor and presser swiveled on the truck whereby the presser may be adjusted into close proximity to the channeler and kept in such relationship as the channeler is adjusted to different positions along the truck.

7. In combination, a truck, a channeler adjustably mounted thereon, a frame swiveled on the truck and a presser mounted on the frame whereby the channeler and presser may be kept in close proximity to each other as the channeler is adjusted to different positions along the truck.

8. In combination, a truck, a channeler adjustably mounted thereon, a frame swiveled on the truck and a motor and presser mounted on the frame whereby the channeler and presser may be kept in close proximity to each other as the channeler is adjusted to different positions along the truck.

9. In combination, a truck, a channeler adjustably mounted thereon, a radially-adjustable frame swiveled on the truck and a presser mounted on the frame whereby the channeler and presser may be kept in close proximity to each other as the channeler is adjusted to different positions along the truck.

10. In combination, a truck, a channeler adjustably mounted thereon, a radially-adjustable frame swiveled on the truck and a motor and presser mounted on the frame whereby the presser may be adjusted into close proximity to the channeler and retained in such relationship as the channeler is adjusted to different positions along the truck.

11. In combination, a channeler-cylinder, a presser-cylinder, their pistons, pipes connecting the corresponding ends of the two cylinders and means for automatically cushioning the channeler-piston comprising a cylinder surmounting the channeler-cylinder, connected ports in the two cylinders and a plunger carried by the channeler-piston, fitted to slide in the cushioning-cylinder and open and close its port as the channeler-piston is reciprocated.

12. In combination, a channeler-cylinder, a presser-cylinder, their pistons, pipes connecting the corresponding ends of the two cylinders, means for cutting off the escape of air from one of the pipes for cushioning the downward stroke of the channeler-piston and means for automatically sustaining the pressure of air in the last-named pipe.

13. In combination, a channeler-cylinder, a presser-cylinder, their pistons, pipes connecting the corresponding ends of the two cylinders, a receiver pressure-supply, manually-operated means for cutting off the escape of air from one of the pipes for cushioning the downward stroke of the channeler-piston and means for automatically supplying pressure to said pipe from the receiver pressure-supply to sustain the air-cushion for the downward stroke of the channeler-piston.

14. In combination, a channeler-cylinder, a presser-cylinder, their pistons, pipes connecting the corresponding upper and lower ends of the two cylinders and a valve arranged to cut off the supply of air from the lower end of the presser-cylinder to the lower end of the channeler-cylinder and at the same time to open the lower end of the presser-cylinder to the atmosphere.

15. In combination, a channeler-cylinder, a presser-cylinder, their pistons, pipes connecting the corresponding upper and lower ends of the two cylinders, a receiver pressure-pipe leading to the lower pipe, an automatically-operating valve in the receiver pressure-pipe and a valve arranged to cut off the supply of air from the lower end of the presser-cylinder to the lower pipe and to open the lower end of the presser-cylinder to the receiver pressure-pipe.

16. In combination, a channeler-cylinder, a presser-cylinder, their pistons, pipes connecting the corresponding upper and lower ends of the two cylinders, a receiver pressure-pipe leading to the lower pipe, an automatically-operating valve in the receiver pressure-pipe, an exhaust to the atmosphere and a three-way valve arranged to open the lower end of the presser-cylinder at pleasure to the exhaust, to the receiver pressure-pipe or to the said lower pipe.

17. In combination, a channeler-cylinder, a presser-cylinder, their pistons, pipes connecting the upper and lower ends of the two cylinders, an induction-valve for the presser-cylinder, a receiver pressure-pipe communicating with the lower pipe, a one-way valve in the receiver pressure-pipe, a manually-operated valve arranged to open communication from the lower end of the presser-cylinder to the said lower pipe or to the receiver pressure-pipe or to the atmosphere and means for holding the valve in its different positions.

In testimony that I claim the foregoing as my invention I have signed my name, in presence of two witnesses, this 14th day of April, A. D. 1905.

ARTHUR HENRY GIBSON.

Witnesses:
H. D. MAXWELL,
CLARA D. PATTERSON.

---

It is hereby certified that in Letters Patent No. 805,195, granted November 21, 1905, upon the application of Arthur Henry Gibson, of Easton, Pennsylvania, for an improvement in "Electropneumatic Channelers," errors appear in the printed specifications requiring correction, as follows: In the specification and claims the word "presser" wherever it occurs should read *pressor;* and that the said Letters Patent should be read with these corrections therein that the same may conform to the record of the case in the Patent Office.

Signed and sealed this 5th day of December, A. D., 1905.

[SEAL.]

F. I. ALLEN,
*Commissioner of Patents.* leading to the lower pipe, an automatically-operating valve in the receiver pressure-pipe, an exhaust to the atmosphere and a three-way valve arranged to open the lower end of the presser-cylinder at pleasure to the exhaust, to the receiver pressure-pipe or to the said lower pipe.

17. In combination, a channeler-cylinder, a presser-cylinder, their pistons, pipes connecting the upper and lower ends of the two cylinders, an induction-valve for the presser-cylinder, a receiver pressure-pipe communicating with the lower pipe, a one-way valve in the receiver pressure-pipe, a manually-operated valve arranged to open communication from the lower end of the presser-cylinder to the said lower pipe or to the receiver pressure-pipe or to the atmosphere and means for holding the valve in its different positions.

In testimony that I claim the foregoing as my invention I have signed my name, in presence of two witnesses, this 14th day of April, A. D. 1905.

ARTHUR HENRY GIBSON.

Witnesses:
H. D. MAXWELL,
CLARA D. PATTERSON.

---

Corrections in Letters Patent No. 805,195.

It is hereby certified that in Letters Patent No. 805,195, granted November 21, 1905, upon the application of Arthur Henry Gibson, of Easton, Pennsylvania, for an improvement in "Electropneumatic Channelers," errors appear in the printed specifications requiring correction, as follows: In the specification and claims the word "presser" wherever it occurs should read *pressor;* and that the said Letters Patent should be read with these corrections therein that the same may conform to the record of the case in the Patent Office.

Signed and sealed this 5th day of December, A. D., 1905.

[SEAL.] *W. W. Mortimer*
*Chief Div. 13.*

F. I. ALLEN,
*Commissioner of Patents.*

Corrections in Letters Patent No. 805,195.

It is hereby certified that in Letters Patent No. 805,195, granted November 21, 1905, upon the application of Arthur Henry Gibson, of Easton, Pennsylvania, for an improvement in "Electropneumatic Channelers," errors appear in the printed specifications requiring correction, as follows: In the specification and claims the word "presser" wherever it occurs should read *pressor;* and that the said Letters Patent should be read with these corrections therein that the same may conform to the record of the case in the Patent Office.

Signed and sealed this 5th day of December, A. D., 1905.

[SEAL.]   W. M. Mortimer,
          Chief Div. 13.

F. I. ALLEN,
*Commissioner of Patents.*